March 4, 1969 K. R. LEWIS Re. 26,534

REVOLVER TYPE FIREARM WITH CYLINDER CRANE

Original Filed Nov. 23, 1960

INVENTOR
KARL R. LEWIS
BY McCormick, Paulding & Huber
ATTORNEYS

United States Patent Office

Re. 26,534
Reissued Mar. 4, 1969

26,534
REVOLVER TYPE FIREARM WITH CYLINDER CRANE

Karl R. Lewis, 77 Olney Road, Wethersfield, Conn. 06109

Original No. 3,221,433, dated Dec. 7, 1965, Ser. No. 410,965, Nov. 13, 1964, which is a division of Ser. No. 71,339, Nov. 23, 1960, now Patent No. 3,163,951, dated Jan. 5, 1965. Application for reissue Oct. 12, 1967, Ser. No. 676,660
U.S. Cl. 42—62 7 Claims
Int. Cl. F41c *1/00*

Matter enclosed in heavy brackets [ ] appears in the original patent but forms no part of this reissue specification; matter printed in italics indicates the additions made by reissue.

*ABSTRACT OF THE DISCLOSURE*

*In a revolver type firearm the cylinder is carried by a crane supported for pivotal movement relative to the frame by a pivot portion received in a conforming frame opening. This pivot portion of the crane is hollow and receives a spring for biasing the trigger.*

This application is a division of my co-pending application Serial No. 71,339, filed November 23, 1960, for "Firearm Firing Mechanism," now Patent No. 3,163,951. The invention with which this application is concerned relates to firearms, and deals more particularly with improvements in the construction of small firearms of the revolver type.

The general object of this invention is to provide in a firearm of the revolver type an improved construction of the cylinder crane and [trigger] *firing mechanism* resulting in a saving of space and economies in the manufacture and assembly of the parts of the firearm.

A more particular object of the invention is to provide a biasing means for the trigger *or other part* of a revolver type firearm which biasing means is completely or almost completely received in a bore formed in a part of the cylinder crane which is in turn pivotally supported by the frame of the firearm.

Other objects and advantages of the invention will be apparent from the following description and from the drawing forming a part hereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
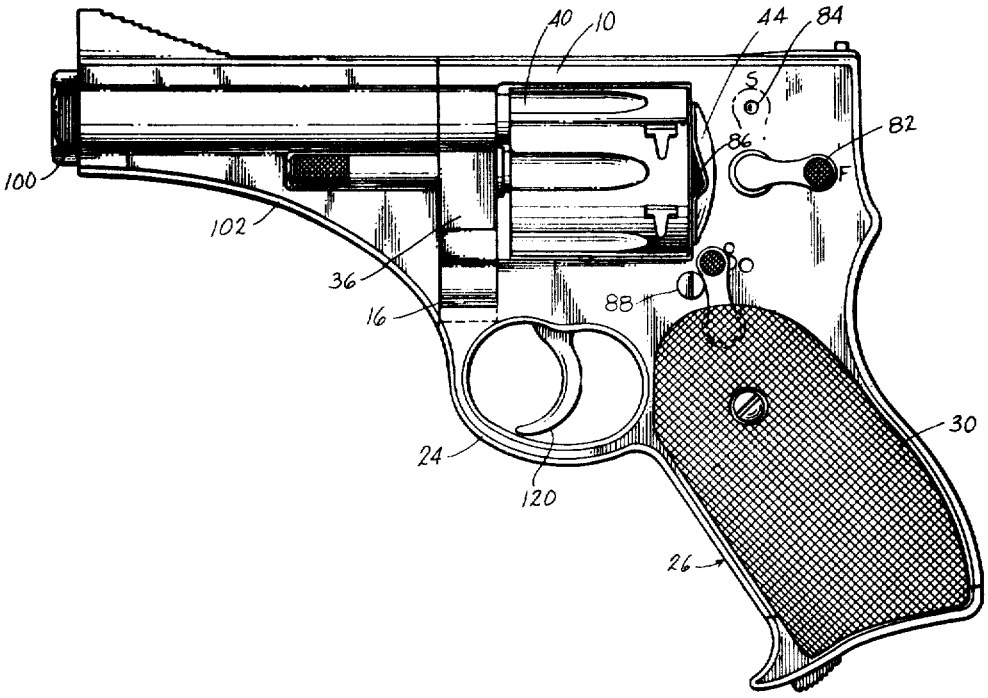
FIG. 1 is a side view of a firearm embodying the present invention.
Figure 2:
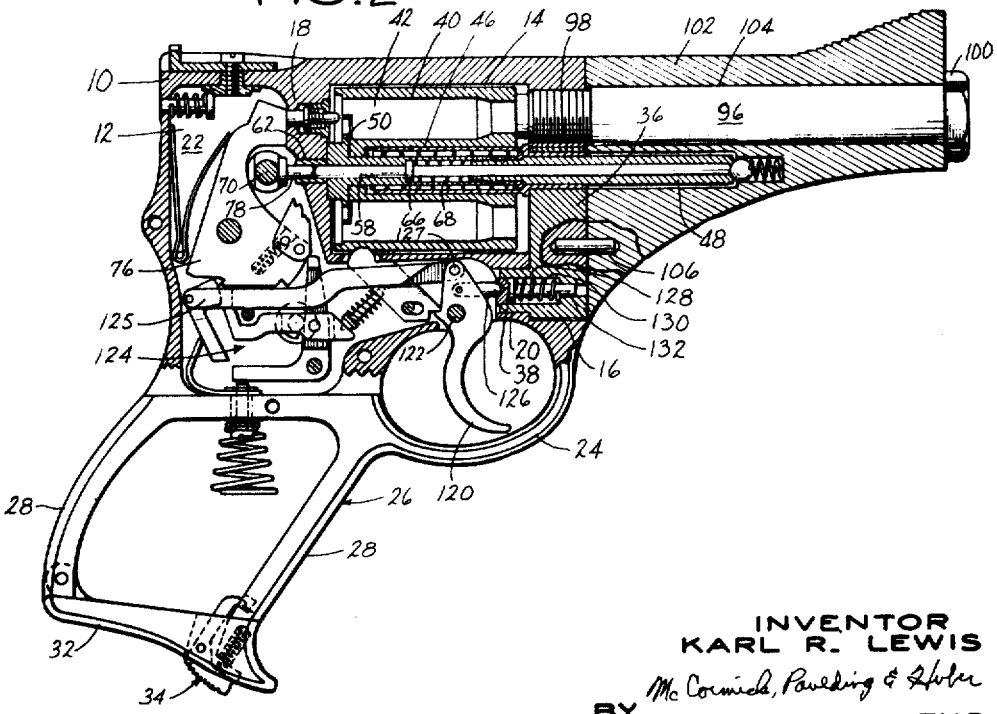
FIG. 2 is a side view of the firearm shown in FIG. 1 with the upper portion thereof being shown in vertical longitudinal section and with the lower portion being shown in elevation with the grip pieces removed from the frame.

Referring now to the drawing and first particularly considering FIGS. 1 and 2, there is shown a firearm embodying the invention and of the revolver pistol type. The firearm comprises a frame 10 which is provided with a mechanism cavity 12, a cylinder recess 14 and a crane recess 16 in the upper portion thereof. Between the mechanism cavity 12 and the cylinder recess 14 is a transverse or intermediate wall 18, and a longitudinal bore 20 extends between the crane recess 16 and the mechanism cavity 12. The mechanism cavity 12 has one side wall 22 which is integral with the other portions of the frame. The outer surface of this wall is shown facing the viewer in FIG. 1. The other side wall of the mechanism cavity is provided by a removable side plate, not shown, which is attached to the side of the frame facing the viewer in FIG. 2 by means of screws or other fasteners. Removal of the side plate provides access to all of the parts of the firing mechanism shown in FIG. 2.

The lower portion of the frame includes a trigger guard 24 of conventional configuration and a depending grip portion 26 located rearwardly of the trigger guard. As shown in FIG. 1, the grip portion of the frame comprises two generally downwardly extending arms 28, 28 that are spaced apart longitudinally of the frame. The arms 28, 28 have attached thereto, two side pieces, one of which is shown at 30 in FIG. 1, which are located one on either side of the frame and which are preferably made of wood or plastic. These side pieces, together with the grip portion of the frame, constitute the grip of the firearm, the grip being hollow to provide a storage chamber for holding extra cartridges or other articles. Access to the storage chamber is provided by a pivotal floor plate 32, as shown in FIG. 2, which is pivotally connected adjacent its rear end to the grip portion 26 and which at its forward end is provided with a releasable latch 34. The latch 34 normally holds the floor plate in closed position with respect to the storage chamber and is manually operable by a thumb or finger to release the floor plate for swinging movement away from the grip portion.

A crane 36 is attached to the frame 10 for outward swinging movement about an axis extending longitudinally of the frame. This mounting of the crane to the frame is obtained by providing the crane with a pivotal portion 38 which is loosely received by the longitudinal frame bore 20. As viewed in FIG. 1, the crane 36 is swingable outwardly about the axis of the longitudinal bore 20 in a direction toward the viewer from the position shown. Swinging movement of the crane in a direction away from the viewer in FIG. 1 is limited by engagement of the crane with the side wall of the crane recess. This side wall is not shown in FIG. 1, but is located immediately behind the crane and is integral with the frame.

A cylinder 40 of somewhat conventional construction is rotatably secured to the crane for rotation about an axis extending longitudinally of the firearm. Normally, the cylinder 40 is positioned within the cylinder recess 14 as shown in FIGS. 1 and 2, but is swingable outwardly therefrom with the crane 36 in order to displace the cylinder to an open position located to one side of the frame for loading and ejecting purposes. The cylinder 40 includes a plurality of cartridge receiving chambers 42, 42 which are shown empty in FIG. 2. When the cylinder is in its normal position, the intermediate wall 18 of the frame and the flanges 44, 44 one of which is formed on either side of the frame behind the cylinder, at least partially close the rear ends of the cartridge chambers 42, 42 to prevent the addition or removal of cartridges to or from the chambers; however, when the cylinder is swung outwardly from the frame, the rear ends of the cylinder cartridge chambers are positioned away from the wall 18 and the adjacent flange 44 so that cartridges may be removed or added.

The cylinder 40 is rotatably secured to the crane 36 for rotation about an axis extending longitudinally of the frame. The particular means for mounting the cylinder to the crane forms no part of this invention and therefore is not described in detail herein. The mounting means illustrated in FIG. 2 are, however, so described in my above-referred to co-pending application and reference may be made thereto for a more complete understanding of the same, if desired.

The cylinder 40 is normally held in the closed position illustrated in FIGS. 1 and 2 by means of a cylinder bolt 58 which has a rearward portion slidably received in the bore of a cartridge extractor 50 and in the bore of a sleeve 62 fitted into the intermediate frame wall 18, and a forward portion slidably received in the bore of an ejector rod 48. The cylinder bolt 58, as shown in FIG. 2, includes an integral collar 66 which is normally held in the rearward position shown by a spring 68. A means provided for moving the cylinder bolt 58 forwardly to unlock the cylinder from the frame for outward swinging movement thereof comprises a cam element 70 that is pivotally connected to the frame 10 for pivotal movement about a transverse axis between active and inactive positions. On its periphery, the cam element 70 has two closely spaced faces and two widely spaced faces. In its inactive position, the cam element 70 is positioned as shown in FIG. 2 so that one of the closely spaced faces engages a cylinder bolt release member 78 which has its forward part positioned in the sleeve 62 and in engagement with the rear end of the cylinder bolt 58, the cylinder bolt 58 under the action of its bias urging the cylinder bolt release member 78 rearwardly and into engagement with the cam element 70. The cam element 70 is moved to an active position by rotating it approximately 90° about its transverse axis from the position shown in FIG. 2. This brings one of the widely spaced faces into such position as to hold the cylinder bolt release member 78 in a forward position at which the cylinder bolt 58 is held out of the sleeve 62 so that the cylinder is freed for lateral swinging movement. Movement of the cam element 70 from its active to its inactive position is produced by manual operation of a lever 82 located on the outside surface of the firearm as shown in FIG. 1, the latter being connected with the cam element 70 which extends through the side wall 22 of the mechanism cavity 12. With the lever 82 in the position marked F as shown in FIG. 1, the cam element 70 is disposed in its FIG. 2 position while with the lever in the position marked S in FIG. 1, as shown by the broken lines, the cam 70 is in a position at which the cylinder bolt is shifted forwardly and released from the frame to permit lateral outward movement of the cylinder. At both the S and F positions of the lever 82 the frame 10 is provided with an indent, such as shown at 84 in FIG. 1, which cooperates with the lever to releasably hold it in the position to which it is moved.

Referring to FIG. 1, it will also be noted that the flange 44 located on the side of the frame from which the cylinder 40 swings is provided with a cam surface 86 which engages the rear end of the cylinder bolt 58 and cams the same forwardly as the cylinder is swung from its open position back to its normal closed position. When the cylinder is in its open position, it is held in place on the sleeve 46 by a blocking element 88 which is connected with the frame and has a forwardly facing surface that abuts the rear face of the cylinder to restrain its rearward movement.

The barrel 96 of the firearm is located in front of the cylinder 40 and has a threaded rear portion 98 which is received in a corresponding threaded opening in the frame 10. The barrel, of course, is so located with respect to the frame and the cylinder 40 that the longitudinal axis of its bore is in alignment with the longitudinal axis of the upper or active chamber 42. The forward end of the barrel 96 is provided with a radially outwardly extending flange 100. A shroud 102 surrounds the barrel 96 and extends substantially the entire length of the barrel from the forward end face of the frame to the barrel flange 100. The shroud 102 has a bore 104 for receiving the barrel which bore conforms closely to the outside surface of the barrel, but with a sufficiently loose fit existing between the barrel and the shroud as to permit the barrel to slide longitudinally and angularly of the shroud during assembly or disassembly of the firearm. The shroud 102 is held longitudinally in place on the barrel by means of engagement with the forward face of the frame 10 at its rear end and by means of engagement with the barrel flange 100 at its other end. Angular displacement of the shroud with respect to the frame is prevented by means of a locking pin 106 which extends between the frame and the shroud and which is preferably located below the barrel as shown in FIG. 2. In FIG. 2, the partial section illustrating the locking pin 106 is taken on a plane located in front of or closer to the viewer than the plane of which the remainder of the view is taken.

The firing mechanism of the firing arm is located in the mechanism cavity 12 and is described in detail in my above-referred to co-pending application to which reference is made for a more detailed description thereof. For the present, it is sufficient to note that in addition to the hammer 76 the mechanism includes a trigger 120 which is supported for pivotal movement relative to the frame 10 by a pivot pin 122. The lower or finger engageable portion of the trigger 120 is movable in a conventional manner between forward and rearward positions relative to the frame, and connected with the hammer is a means, indicated generally at 124 for controlling the movement of the hammer in response to the movement of the trigger. This means in turn includes a trigger bar 125 pivotally connected by a pivot pin 127 with a portion of the trigger extending upwardly beyond the pivot pin 122. The trigger is biased in the counterclockwise direction, as view in FIG. 2, so that the lower portion thereof is normally held in the forward position illustrated.

In accordance with the invention, the aforesaid bias for the trigger is provided by a biasing means located substantially entirely in the pivotal portion 38 of the cylinder crane 36. As shown, this means comprises a connecting pin 126 which is pivotally connected at its rear end to the upper portion of the trigger 120 and which extends forwardly into or at least toward a bore 128 formed in the pivotal portion 38 of the crane 36. As shown, the bore 128 includes a large diameter rear portion and a smaller diameter forward portion. In the rear portion of the bore 128 is a helical compression spring 130 and the major portion of a spring guide 132, the spring guide engaging the forward end of the connecting pin 126 and urging it rearwardly under the influence of the spring. The spring guide 132 includes an enlarged head at its rear end which is slidably received in the enlarged portion of the bore 128 and a smaller diametered stem which extends forwardly through the center of the spring 130 to prevent the spring from buckling or bending in the transverse direction. At its forward end, the stem is slidably received in the smaller diametered portion of the bore 128. The enlarged head of the spring guide has a forward face which abuts the spring 130 and a rear face which abuts the connector pin 126, the latter face preferably being provided with a depression or indent for receiving the forward end of the connector, as illustrated. The spring 130 and the connector pin therefore function to normally hold the lower portion of the trigger in the illustrated forward position and to oppose its movement to the rear. Accordingly, the trigger bias means is accommodated in the otherwise unused space occupied by the crane pivotal portion 38 and provides a compact, reliable and easily assembled construction for the firearm.

The invention claimed is:

1. The combination is a revolver type firearm of: a frame having a mechanism cavity, a cylinder recess, a crane recess, and a longitudinal bore extending between said mechanism cavity and said crane recess; a crane having a pivot portion loosely received by said longitudinal frame bore for pivotally supporting said crane for swinging movement into and out of said crane recess, said pivot portion of the crane having a longitudinal bore therein which bore communicates with said mechanism cavity; a cylinder attached to said crane and swingable therewith into and out of said cylinder recess; a trigger having an upper portion located in said mechanism cavity rearwardly of said frame bore and a lower portion extending out of said cavity and adapted for engagement with a finger of a person holding the firearm, said trigger being pivotally movable relative to said frame; a member pivotally connected to said trigger and extending forwardly therefrom into said crane bore; and spring means housed in said crane bore which spring means engages said member and biases the same so as to oppose rearward movement of the lower trigger portion and which serves to return said lower trigger portion to a forward position after such rearward movement.

2. The combination in a firearm of: a frame having a mechanism cavity and a longitudinal bore communicating with said cavity, a crane having a pivot portion loosely received by said longitudinal frame bore so as to be pivotally supported relative to said frame, said pivot portion of said crane having a bore therein which communicates with said mechanism cavity, a trigger pivotally movable relative to said frame which trigger includes an upper portion located in said mechanism cavity rearwardly of said crane bore and a lower portion adapted for engagement with a finger of a person holding the firearm, a member connected to said upper portion of said trigger and extending forwardly therefrom toward said crane bore, and spring means housed in said crane bore which spring means engages said member and biases the same so as to oppose rearward movement of said lower trigger portion and which serves to return said lower trigger portion to a forward position after such rearward movement.

3. The combination defined in claim 2 further charcterized by said crane bore including an enlarged diameter rear portion and a smaller diameter forward portion, and spring means comprising a spring guide having an enlarged head slidably received in said enlarged portion of said crane bore and a stem portion extending forwardly from said head and into said smaller diametered portion of said crane bore, and a spring surrounding said stem portion of said guide.

4. The combination defined in claim 3 further characterized by said member connected to said trigger being pivotally connected at its rear end to said trigger and at its forward end directly engaging said enlarged head of said spring guide, said spring guide having an indent for at least partially receiving the forward end of said member.

5. The combination in a firearm of: a frame, a firing mechanism associated with said frame and including a trigger pivotally connected with said frame for movement between first and second positions relative to said frame, a crane pivotally connected with said frame and including a pivot portion having a bore therein facing said trigger, a member connected with said trigger and extending toward said crane pivot portion bore, and spring means housed in said crane pivot portion bore which spring means engages said member and biases the same so as to oppose movement of said trigger from its first to its second position.

*6. The combination in a firearm of: a frame, a firing mechanism associated with said frame and including a part supported for movement between first and second positions relative to said frame, a crane pivotally connected with said frame and including a pivot portion having a bore therein facing said part, a member extending between said part and said crane pivot portion bore, and spring means housed in the said crane pivot portion bore which spring means engages said member and biases the same so as to oppose movement of said part from its first to its second position.*

*7. The combination in a firearm of: a frame having a mechanism cavity and a longitudinal bore communicating with the said cavity, a crane having a pivot portion loosely received by said longitudinal frame bore so as to be pivotally supported relative to said frame, said pivot portion of said crane having a bore therein which communicates with said mechanism cavity, a firing mechanism including a part located at least partially in said mechanism cavity and supported for movement relative to said frame between first and second positions, and means for biasing said part so as to oppose movement thereof from its first to its second position, said biasing means including a spring housed within said crane pivot portion bore.*

References Cited

The following references, cited by the Examiner, are of record in the patented file of this patent or the original patent.

UNITED STATES PATENTS

| | | | |
|---|---|---|---|
| 2,846,925 | 8/1958 | Norman | 42—69 X |
| 2,927,390 | 3/1960 | Lewis | 42—65 |
| 2,958,151 | 11/1960 | Sefried | 42—62 X |

BENJAMIN A. BORCHELT, *Primary Examiner.*

U.S. Cl. X.R.

42—65